Aug. 19, 1924.
J. C. CREAGMILE ET AL
1,505,088
FOOT CONTROLLED ACCELERATOR
Filed July 2, 1923
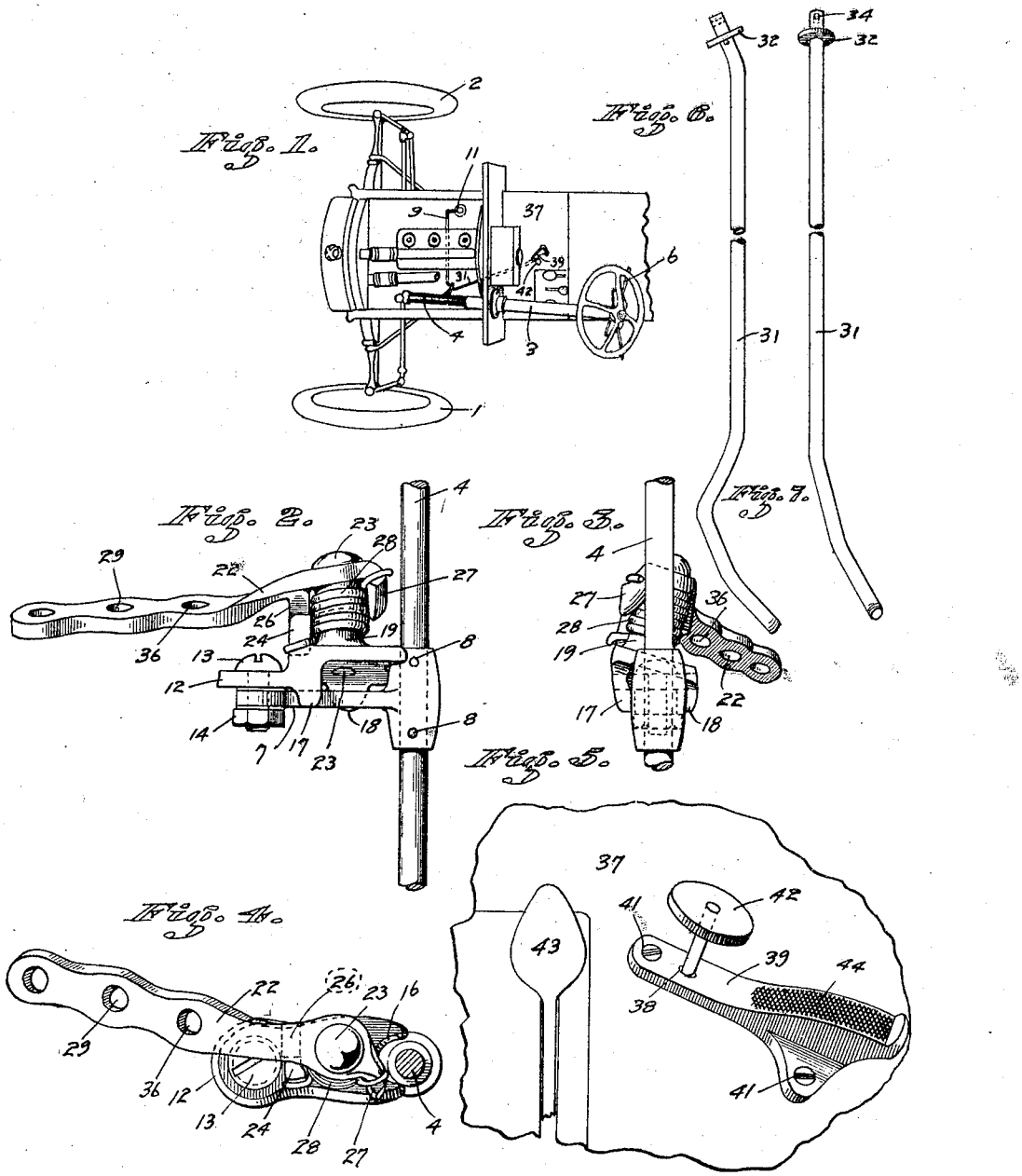
INVENTOR.
JOHN C. CREAGMILE
CHARLES W. HARTMANN
BY
ATTORNEY.

Patented Aug. 19, 1924.

1,505,088

UNITED STATES PATENT OFFICE.

JOHN C. CREAGMILE AND CHARLES W. HARTMANN, OF OAKLAND, CALIFORNIA.

FOOT-CONTROLLED ACCELERATOR.

Application filed July 2, 1923. Serial No. 648,929.

*To all whom it may concern:*

Be it known that we, JOHN C. CREAGMILE and CHARLES W. HARTMANN, citizens of the United States of America, both residing at 459 Second Street, Oakland, in the county of Alameda and State of California, have invented certain new and useful Improvements in Foot-Controlled Accelerators, of which the following is a specification.

The present invention is an improved foot controlled accelerator for Ford engines. The objects of this invention include;

(1) The provision of a mechanism which can be readily installed on the standard equipment of a Ford automobile without alteration or mutilation of the hand controlled throttle rod or parts to which the parts are attached and which, when so installed, may be operated by the driver's foot to control the carbureter;

(2) The provision of means, responsive to foot pressure, for imparting rotary motion to the throttle rod which will cause said rod to act in a manner identical with that caused by the hand control but which will be at all times yieldable to said hand control;

(3) The provision, in a foot pressed accelerator, of a foot rest, adapted to various sizes of feet and inclined, with respect to the floor, in such a manner that nicety of control will not be interrupted by the surge of an automobile travelling over uneven road surface;

Other objects and advantages will be seen as this description proceeds.

In this specification and the annexed drawings, the invention is illustrated in the form considered to be the best, but it is to be understood that the invention is not limited to such form, because it may be embodied in other forms and it is also to be understood that in and by the claims following the description it is desired to cover the invention in whatever form it may be embodied.

In the accompanying one sheet of drawings,

Figure 1 is a fragmentary top plan view of a Ford automobile showing the steering column, hand throttle lever, and showing our invention associated therewith, Fig. 2 is an elevation of a fragment of the throttle rod found on Ford engines, showing an arm thereon to which are secured parts of our invention, Fig. 3 is a side elevation of Fig. 2, Fig. 4 is a top plan view of Fig. 2, Fig. 5 is a fragmentary view of a floor board of a Ford automobile showing our foot rest and thrust rod secured thereto, Fig. 6 is a side elevation of a thrust rod, and Fig. 7 is a side elevation of Fig. 6.

Referring to the drawings, the numerals 1 and 2 indicate the front wheels of a Ford automobile. These wheels are controlled by the steering column 3 with which is associated a throttle rod 4 rotated by a hand lever 6. An arm 7 is secured to the rod 4 by pins 8, Fig. 2. To the end of this arm 7 remote from the rod 4 is secured one end of a carbureter pull rod 9, Fig. 1, and the opposite end of this pull rod is secured to the throttle lever on a carbureter 11.

All of the parts so far described are conventional equipment on Ford engines and form no part of the present invention.

As our foot control is supplemental to the standard hand control and must be readily attachable thereto, we disconnect that end of the carbureter pull rod 9 which engages the eye in arm 7 and secure a casting 12 to said arm by means of a bolt 13 and nut 14.

In order to make one bolt suffice to connect this casting 12 to the arm 7 and to insure positive movement of said arm when the casting is moved, we bifurcate the end of said casting that is remote from the bolt 13, as shown at 16, Fig. 4, to engage the tubular bearing portion of the arm 7, and we also provide lugs 17 and 18, Fig. 2, which straddle the arm (7) proper.

The main floor portion of the casting 12 is on a plane oblique to the arm 7, as best shown in Figs. 2 and 3. The purpose of this obliquity will be later described. This floor portion of casting 12 carries an upstanding boss 19. A similar boss 21 depends from a lever arm 22. This lever arm is pivotally mounted on the casting 12 by a pivot pin 23 extending through the bosses 19 and 21, and through casting 12 and lever 22.

In order to limit the rotative movement of lever 22 with respect to the arm 7 we provide a lug 24, Figs. 2 and 4, on the casting 12, and lugs 26 and 27 on the lever 22. When the lever 22 is rotated one of these lugs encounter the lug 24. In order to prevent friction between the bosses 19 and 21, we make the lug 26 long enough to ride on the floor of casting 12.

The lug 26 is normally urged to contact with lug 24 by a coiled spring 28 which surrounds bosses 19 and 21 and bears at one end against lug 24 and at the other end against lug 27. The pivot pin 23 is riveted on the under side of the floor of casting 12, as shown in Fig. 2, so that the lever 22, spring 28, and casting 12 may be secured as a unit to the arm 7 by bolt 13.

When this is done, the carbureter pull rod 9 is inserted in a hole 29 in lever 22, whereupon the hand control is restored to operative position. In order to make the device responsive to foot pressure we employ a thrust rod 31, Figs. 6 and 7. One end of this rod is provided with a washer 32, abutting ears 32 struck out from rod 31, and with a hole 34 for engaging a cotter pin. This end of thrust rod 31 is inserted in a hole 36 in lever 22 until the washer 32 overlies said lever and a cotter pin is inserted in hole 34 to hold the parts in engagement.

The opposite end of thrust rod 31 extends through the floor board 37 and through a hole 38 in a foot rest 39, Figs. 1 and 5, secured by screws 41 to the floor. The end of the rod 31 protruding above the foot rest 39 is threaded for engagement with a push button 42.

The operation of our invention is as follows; the foot rest 39 is positioned at the right of the brake pedal 43, convenient to the right foot of a driver. When it is desired to accelerate the engine, foot pressure is applied to push button 42. The thrust of rod 31 is thus exerted on lever 22. Because of the obliquity of the pivotal mounting of this lever, the thrust so applied tends to rotate said lever (against the urge of spring 28) and actuate pull rod 9 governing the carbureter.

When foot pressure is released the spring 28 returns said lever to its initial position wherein lug 26 encounters lug 24.

The foot rest 39 is wedge shaped in elevation and is milled or roughened on the upper surface as indicated at 44, Fig. 5, to insure against slippage and to accommodate large or small feet.

The slanting top surface of the foot rest affords a support for the outer edge of the driver's foot, and this support prevents uneven or sudden pressure on the push button 42 which might otherwise result from travel over uneven road surface.

A slight lateral rocking movement of the driver's foot will depress the push button and accelerate the engine.

We claim;

1. A foot pressure operated accelerator for Ford engines comprising a member secured to the pull rod arm of the throttle rod of said engine, a pivot on said member in oblique relation to the plane of rotation of said arm, a lever mounted on said pivot, stops adapted to limit the movement of said lever relative to said member, a pull rod connecting said lever with the throttle lever of the carbureter of said engine, yieldable means normally urging said lever to throttle closing position, and means responsive to foot pressure for actuating said lever.

2. In a foot controlled accelerator mechanism for attachment to a throttle rod arm, said arm adapted by its rotative movement to control a carbureter, a member adapted to straddle said arm and provided at one end with a bifurcation for engagement therewith and at the other end with means for removable engagement therewith, and also provided with a surface oblique to said arm, a pivot pin disposed perpendicularly to said oblique surface, and a lever oscillatively mounted on said pivot for movement relative to said member.

3. In a foot controlled accelerator mechanism for attachment to a throttle rod arm, said arm adapted by its rotative movement to control a carbureter, a member adapted to straddle said arm and provided at one end with a bifurcation for engagement therewith, and also provided with a surface oblique to said arm, a pivot pin disposed perpendicularly to said oblique surface, a lever oscillatively mounted on said pivot for movement relative to said member, and a spring normally resisting said movement of said lever.

4. In a foot controlled accelerator mechanism for attachment to a throttle rod arm, said arm adapted by its rotative movement to control a carbureter, a member adapted to straddle said arm and provided at one end with a bifurcation for engagement therewith and at the other end with means for removable engagement therewith, and also provided with a surface oblique to said arm, a pivot pin disposed perpendicularly to said oblique surface, a lever oscillatively mounted on said pivot for movement relative to said member, a spring normally resisting said movement of said lever, and means for limiting the movement of said lever.

5. In a foot controlled accelerator mechanism for attachment to a throttle rod arm, said arm adapted by its rotative movement to control a carbureter, a member adapted to straddle said arm and provided at one end with a bifurcation for engagement therewith and at the other end with means for removable engagement therewith, and also provided with a surface oblique to said arm, a pivot pin disposed perpendicularly to said oblique surface, a lever mounted on said pivot for movement relative to said member, a spring normally resisting said movement of said lever, and a lug on said lever adapted to bear against said oblique surface when said lever is oscillated on its pivot.

In testimony whereof we affix our signatures.

JOHN C. CREAGMILE.
CHARLES W. HARTMANN.